(12) United States Patent
Chung et al.

(10) Patent No.: US 8,208,485 B2
(45) Date of Patent: Jun. 26, 2012

(54) ROUTING METHOD AND WIRELESS NETWORK SYSTEM

(75) Inventors: Tae-Yun Chung, Gangneung-si (KR); Hyung-Bong Lee, Gangneung-si (KR); Ui-Min Jung, Gangneung-si (KR)

(73) Assignee: Gangneung-Wonju National University Industry Academy Cooperation Group, Gangneung-si, Gangwon-do (KR)

( * ) Notice: Subject to any disclaimer, the term of this patent is extended or adjusted under 35 U.S.C. 154(b) by 237 days.

(21) Appl. No.: 12/448,854

(22) PCT Filed: Jan. 10, 2008

(86) PCT No.: PCT/KR2008/000152
§ 371 (c)(1),
(2), (4) Date: Jul. 10, 2009

(87) PCT Pub. No.: WO2008/091069
PCT Pub. Date: Jul. 31, 2008

(65) Prior Publication Data
US 2010/0118736 A1     May 13, 2010

(30) Foreign Application Priority Data
Jan. 25, 2007  (KR) .................. 10-2007-0008081

(51) Int. Cl.
*H04J 3/16* (2006.01)
*G08C 17/00* (2006.01)
*H04W 4/00* (2009.01)
*H04W 72/00* (2009.01)
*H04J 3/24* (2006.01)

(52) U.S. Cl. ........ 370/437; 370/311; 370/329; 370/341; 370/349; 455/450; 455/453

(58) Field of Classification Search .................. None
See application file for complete search history.

(56) References Cited

U.S. PATENT DOCUMENTS

| | | | |
|---|---|---|---|
| 6,658,010 B1 | 12/2003 | Enns et al. | |
| 6,965,575 B2 | 11/2005 | Srikrishna et al. | |
| 7,366,113 B1 * | 4/2008 | Chandra et al. | 370/255 |
| 2004/0264379 A1 | 12/2004 | Srikrishna et al. | |
| 2005/0032522 A1 | 2/2005 | Soong et al. | |
| 2007/0070909 A1 * | 3/2007 | Reeve | 370/238 |
| 2008/0051036 A1 * | 2/2008 | Vaswani et al. | 455/69 |

FOREIGN PATENT DOCUMENTS

| | | |
|---|---|---|
| KR | 10-2003-0013687 A | 2/2003 |
| KR | 10-0705499 B1 | 6/2006 |

* cited by examiner

*Primary Examiner* — Ayaz Sheikh
*Assistant Examiner* — Sori Aga
(74) *Attorney, Agent, or Firm* — The Nath Law Group; Jerald L. Meyer; Robert T. Burns

(57) ABSTRACT

A routing method of a wireless network system is provided. Paths of the wireless network system are divided into down-stream and up-stream paths. The up-stream paths are reset for each period, or whenever a network is changed, or whenever transmission of data fails more than a predetermined number of times. Accordingly, it is possible to secure an average lifetime of a wireless network system by previously preventing a bottleneck from occurring at a specific node, increase a transmission speed of data by reducing the hop count to the sink node connected to the information collector, and reduce power consumption of a battery.

4 Claims, 3 Drawing Sheets

[Fig. 1]
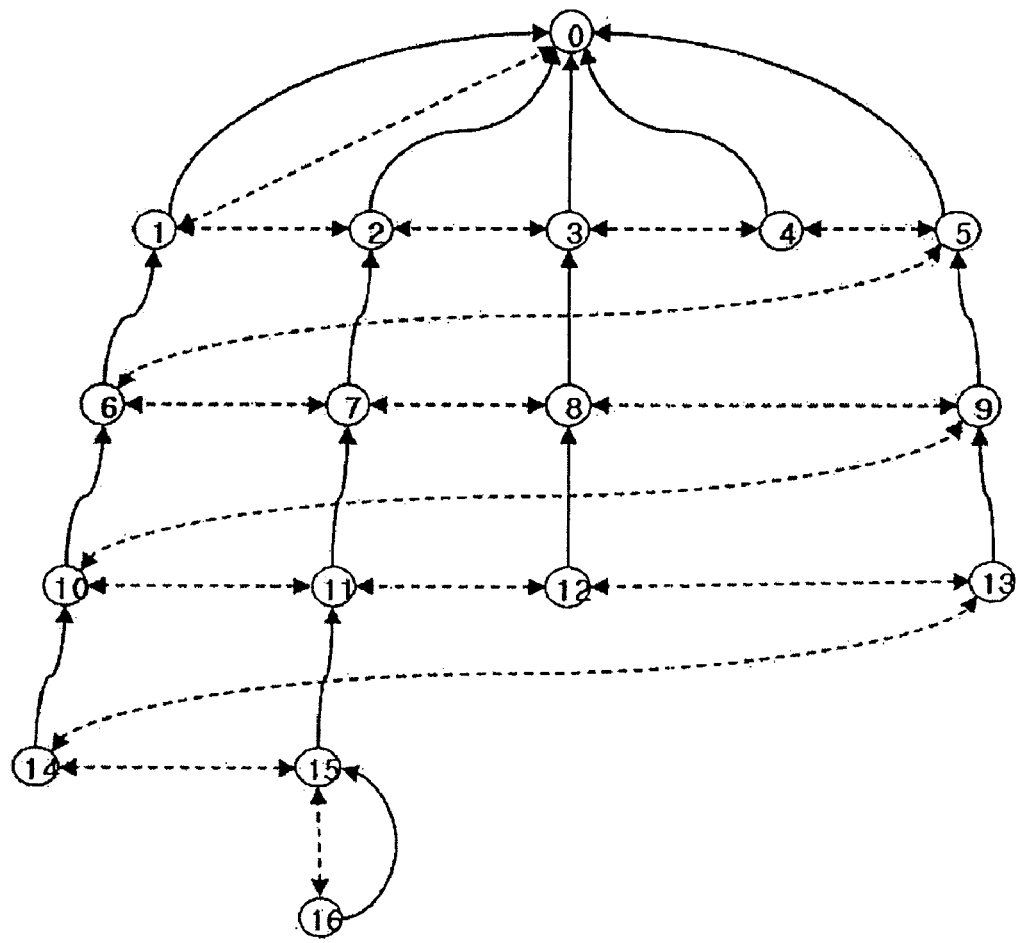
[Fig. 2]
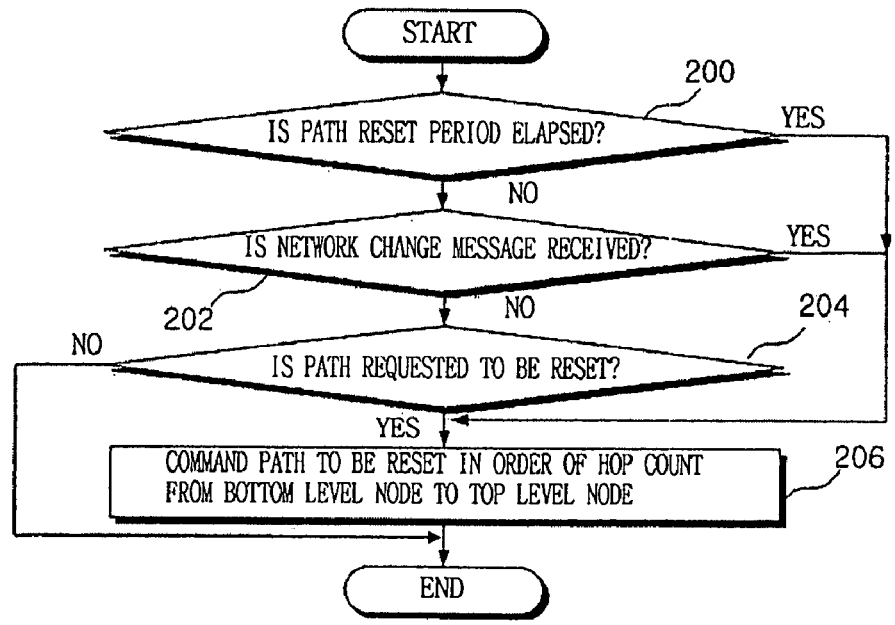

[Fig.3]
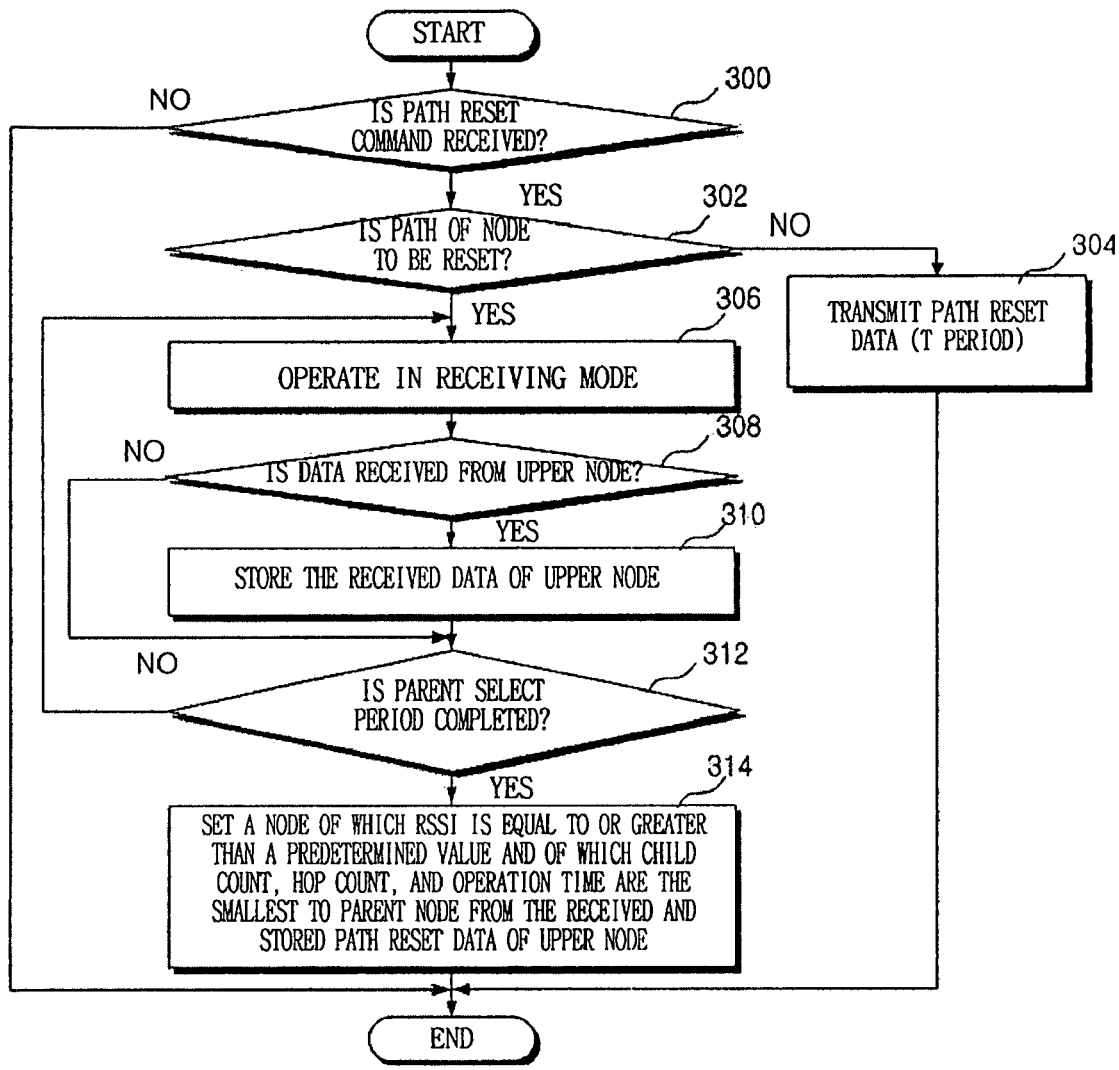

[Fig.4]
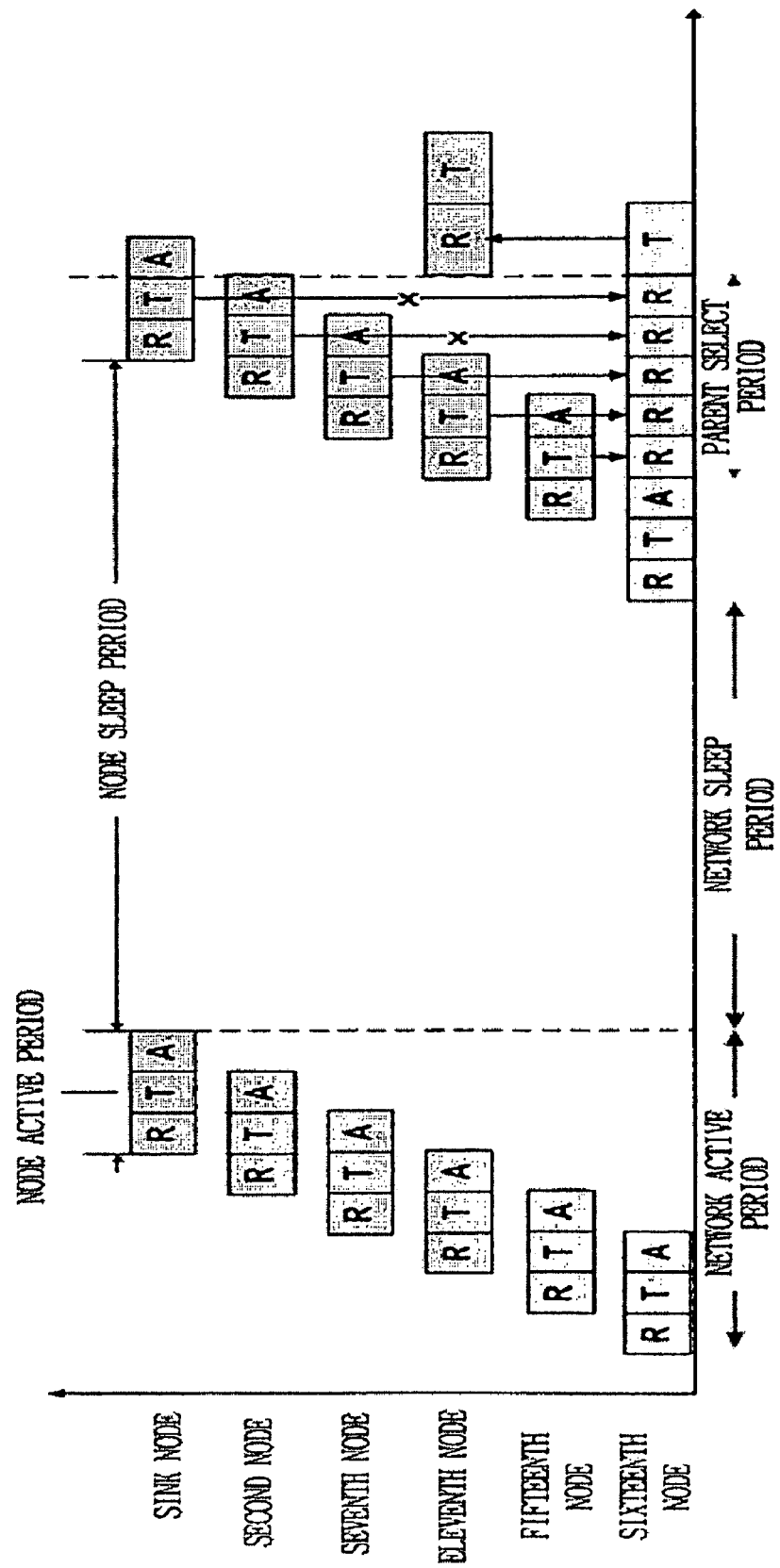

ROUTING METHOD AND WIRELESS NETWORK SYSTEM

This is a National Phase Application filed under 35 USC 371 of International Application No. PCT/KR2008/000152, filed on Jan. 10, 2008, which claims foreign priority benefits under 35 USC 119 of Korean Application No. 10-2007-0008081, filed on Jan. 25, 2007, the entire content of each of which is hereby incorporated herein by reference in its entirety.

TECHNICAL FIELD

The present invention relates to a wireless network system, and more particularly, to a routing method for safely and rapidly transmitting massive data to a sink node connected to an information collector and a wireless network system therefor.

BACKGROUND ART

In general, a wireless network system serves to sense surrounding information by distributing hundreds or thousands of small sensor nodes over a wide area, generate data on the sensed surrounding information, and transmit the surrounding information to a distant information collector. The wireless network system is used for a military purpose, a purpose of measuring natural environments, a purpose of surveilling emergent situations, and the like. The sensor nodes serve to generate data on the sensed surrounding information. In addition, the sensor nodes operate as routers for transmitting data received from another sensor node to the next sensor node.

In addition, the wireless network system transmits information data, which is generated by the sensor node that is a data source, to a distant information collector that needs the information data through multi-hops. Accordingly, the wireless network system needs a suitable routing protocol so as to set an optimal path when transmitting information data. Furthermore, as areas to which the wireless network system can be applied have been widened, transmission of massive data such as image data is required.

Accordingly, a technique for securing a mean lifetime of a wireless network system by previously preventing a bottleneck from occurring at a specific node, increasing a transmission speed of data by reducing the hop count to the sink node connected to the information collector, and reducing power consumption of a battery has to be developed.

DISCLOSURE

Technical Problem

The present invention provides a routing method for safely and speedily transmitting massive data to a sink node connected to an information collector and a wireless network system therefor.

Technical Solution

According to an aspect of the present invention, there is provided a routing method of a wireless network system, the routing method comprising: (a) forming a down-stream path with a linear structure and an up-stream path with a mesh structure; and (b) resetting the up-stream path for each predetermined period, or whenever a network is changed, or whenever data transmission fails more than a predetermined number of times.

In the above aspect of the present invention, the resetting of the up-stream path may comprise: transmitting a path reset command in order of hop count or to all the nodes by using the sink node; checking whether a hop count included in the path reset command corresponds to a hop count of a node that receives the path reset command by using the node; transmitting data for resetting a path for a transmission period of the node when the hop count dose not correspond to the hop count of the node; receiving data for resetting the path from upper nodes by operating in a receiving mode for a parent selection period when the hop count corresponds to the hop count of the node; and setting one of upper nodes, which transmit data for resetting the path, to a parent node of the node.

In addition, data for resetting the path may include one or more among a hop count, a child count, and an operation time, and the node may set a node, which transmits the path reset data in which one or more among a hop count, a child count, and an operation time are the smallest, to a parent node of the node with respect to path reset data in which RSSI (received signal strength indication) is equal to or greater than a predetermined value among the path reset data.

Accordingly, the wireless network system of the present invention divides paths into down-stream and up-stream paths. The down-stream paths through which a control command is transmitted have a linear structure. The up-stream paths through which massive data is transmitted have a mesh structure.

Advantageous Effects

The wireless network system according to an embodiment of the present invention divides paths into down-stream and up-stream paths. The up-stream paths are reset for each period, or whenever a network is changed, or whenever transmission of data fails more than a predetermined number of times. As a result, it is possible to secure an average lifetime of a wireless network system by previously preventing a bottleneck from occurring at a specific node, increase a transmission speed of data by reducing the hop count to the sink node connected to the information collector, and reduce power consumption of a battery.

DESCRIPTION OF DRAWINGS

FIG. 1 illustrates a structure of a wireless network system according to an exemplary embodiment of the present invention.

FIGS. 2 and 3 are flowcharts of routing methods according to exemplary embodiments of the present invention.

FIG. 4 illustrates an example in which data is transmitted and received among nodes according to an exemplary embodiment of the present invention.

BEST MODE

Hereinafter, a routing structure according to an exemplary embodiment of the present invention will be described with reference to a wireless network system of FIG. 1. The wireless network system shown in FIG. 1 includes a sink node 0, first to fifth nodes 1 to 5 having one hop count, sixth to ninth nodes 6 to 9 having two hop counts, tenth to thirteenth nodes 10 to 13 having three hop counts, fourteenth and fifteenth nodes 14 and 15 having four hop counts, and a sixteenth node 16 having five hop counts. The sink node 0 and the first to sixth nodes 1 to 16 constitute a down-stream path with a linear structure.

An up-stream path with a mesh structure is constructed with a first up-stream path obtained by connecting the sink node 0, the first, sixth, tenth, and fourteenth nodes 1, 6, 10, and 14, a second up-stream path obtained by connecting the sink node 0, the second, seventh, eleventh, fifteenth, and sixteenth nodes 2, 7, 11, 15, and 16, a third up-stream path obtained by connecting the sink node 0, the third, eighth, and twelfth nodes 3, 8, and 12, a fourth up-stream path obtained by connecting the sink node 0 and the fourth node 4, and a fifth up-stream path obtained by connecting the sink node 0, the fifth, ninth, and thirteenth nodes 5, 9, and 13.

As described above, small-size control data is transmitted through the down-stream path with the linear structure. In addition, as described above, massive data is transmitted through the up-stream path with the mesh structure. In order to previously prevent a bottleneck at a specific node due to transmission of the massive data, increase a transmission speed by reducing the hop count to the sink node connected to the information collector, and reduce battery consumption, the up-stream path with the mesh structure is set for each period, or whenever a network change message is received, or when transmission of massive data successively fails at a specific node more than a predetermined number of times.

Hereinafter, a routing method of the wireless network system according to the exemplary embodiment of the present invention will be described in detail with reference to flowcharts of FIGS. 2 and 3.

First, an operation of a sink node of the wireless network system will be described with reference to FIG. 2. The sink node checks whether a predetermined path reset period is elapsed (operation 200). When the path reset period is elapsed, the sink node sequentially transmits a path reset command from a bottom level node to a top level node in order of hop count along the down-stream path (operation 206). That is, as described above, in order to provide the path reset command in order of hop count, the sink node allows the path reset command to include information on the hop count of a node of which path is to be reset.

In addition, the sink node checks whether a network change message corresponding to an addition or deletion of a node is received (operation 202). When the network change message is received, the sink node sequentially transmits the path reset command from the bottom level node to the top level node in order of hop count along the down-stream path (operation 206).

The sink node checks whether a message on a path reset request is received when a transmission failure of massive data occurs more than a predetermined number of times from a lower level node (operation 204). When the message on the path reset request is received, the sink node sequentially transmits a path reset command from the bottom level node to the top level node in order of hop count along the down-stream path (operation 206).

Hereinafter, a procedure in which each node resets the up-stream path with the mesh structure based on the path reset command will be described with reference to FIG. 3. One of the nodes checks whether the path reset command is received from the sink node (operation 300). When the path reset command is received from the sink node, the node checks whether information on the hop count included in the path reset command is the same as the hop count of the node and checks whether the path of the node is to be reset based on the path reset command (operation 302). If the node is not a node of which path is to be reset but an upper level node, the node transmits the path reset data including the hop count, the child count, and an operation time of the node for a transmission period T (operation 304). Here, the operation time is a time counted after the node is initialized.

Alternatively, when the node is a node of which path is to be reset, the node operates in a receiving mode for a parent selection period (operation 306). The parent selection period is obtained by multiplying the transmission period by the hop count of the node. As described above, when receiving data from an upper node, the node that operates in the receiving mode for the parent selection period temporarily stores the data (operations 308 and 310). When the parent selection period is terminated, based on the received and stored path reset data of upper nodes, the node selects an upper node of which received signal strength indication (RSSI) is equal to or greater than a predetermined value and of which a child count, a hop count, and an operation time are the smallest, and sets the upper node to a parent node of the node. (operation 314). Then, the node transmits massive data in an up-stream direction through the node that is set to the parent node.

The procedure of resetting the path according to the embodiment will be described with reference to FIGS. 1 and 4. If the path reset period is elapsed, the network change message is received, or if the path reset request due to a transmission failure of data more than a predetermined number of times occurs at a node, the sink node resets a path from the bottom level node, that is, a node having the largest hop count. That is, a path from the sixteenth node 16 is to be reset. When receiving the path reset command including information on the hop count of the sixteenth node 16, the sixteenth node 16 sets a value obtained by multiplying a receiving period R by the hop count that is 5 to the parent selection period of its own.

The sixteenth node 16 receives the path reset data transmitted from upper nodes that are the first to thirteenth nodes 1 to 13 for the parent selection period of the sixteenth node 16 and stores the received path reset data. Here, since the information on the hop count included in the path reset command does not correspond to the first to thirteenth nodes 1 to 13, the first to thirteenth nodes 1 to 13 transmit the path reset data for the transmission period T of themselves.

Then, based on the path reset data received for the parent selection period, the sixteenth node 16 selects the eleventh node 11 of which RSSI is equal to or greater than a predetermined value and of which a child count, a hop count, and an operation time are the smallest and sets the eleventh node 11 to the parent node of the sixteenth node 16.

When setting of the parent node of the sixteenth node 16 is completed, the sink node transmits the path reset command including information on the next hop count to all the nodes. When receiving the path reset command including the information on the next hop count, that is, when the fifteenth node 15 receives the path reset command including information on the hop count of the fifteenth node 15, fifteenth node 15 sets a value obtained by multiplying the receiving period R by the hop count of the fifteenth node 15 which is four to the parent selection period of its own.

The fifteenth node 15 receives the path reset data transmitted from the upper nodes that are the first to ninth nodes 1 to 9 for the parent selection period of the fifteenth node 15 and stores the received path reset data. Here, since the information on the hop count included in the path reset command does not correspond to the first to ninth nodes 1 to 9, the first to ninth nodes 1 to 9 transmit the path reset data for the transmission period T of themselves. Then, based on the path reset data received for the parent selection period, the fifteenth node 15 selects an upper node of which RSSI is equal to or greater than a predetermined value and of which a child count, a hop count, and an operation time are the smallest and sets the upper node to the parent node of the fifteenth node 15. Up to now, setting of the up-stream path of all the nodes is completed.

Although in an embodiment of the present invention, the sink node sequentially transmits the path reset command from a bottom level node to a top level node in order of hop count along the down-stream path, it will be understood by those skilled in the art that the sink node may concurrently transmit the path reset command to all the nodes.

While the present invention has been particularly shown and described with reference to exemplary embodiments thereof, it will be understood by those skilled in the art that various changes in form and details may be made therein without departing from the spirit and scope of the present invention as defined by the appended claims.

INDUSTRIAL APPLICABILITY

The technique of the present invention will be widely used for a routing technique of a wireless sensor network constructed with a plurality of sensor nodes.

The invention claimed is:

1. A routing method of a wireless network system, the routing method comprising:
   (a) forming a down-stream path with a linear structure and an up-stream path with a mesh structure; and
   (b) resetting the up-stream path for each predetermined period, or whenever a network is changed, or whenever data transmission fails more than a predetermined number of times,
   wherein (b) comprises:
   (b1) transmitting a path reset command in order of hop count by using the sink node;
   (b2) checking whether a hop count included in the path reset command corresponds to a hop count of a node that receives the path reset command by using the node;
   (b3) transmitting data for resetting a path for a transmission period of the node when the hop count does not correspond to the hop count of the node;
   (b4) receiving data for resetting the path from upper nodes by operating in a receiving mode for a parent selection period when the hop count corresponds to the hop count of the node; and
   (b5) setting one of upper nodes, which transmit data for resetting the path, to a parent node of the node.

2. The routing method of claim 1,
   wherein data for resetting the path includes one or more among a hop count, a child count, and an operation time, and
   wherein the node sets a node, which transmits the path reset data in which one or more among a hop count, a child count, and an operation time are the smallest, to a parent node of the node with respect to path reset data in which RSSI (received signal strength indication) is equal to or greater than a predetermined value among the path reset data.

3. A wireless network system constructed with a sink node and a plurality of nodes,
   wherein a down-stream path with a linear structure and an up-stream path with a mesh structure are formed between the sink node and the plurality of nodes, and
   wherein the up-stream path is reset for each predetermined period, or whenever a network is changed, or whenever data transmission fails more than a predetermined number of times,
   wherein the sink node transmits a path reset command in order of a hop count, and
   wherein a node that receives the path reset command checks whether a hop count included in the path reset command corresponds to a hop count of the node, when the hop count does not correspond to the hop count of the node, the node transmits data for resetting a path for a transmission period of the node, when the hop count corresponds to the hop count of the node, the node receives the data for resetting the path from the upper nodes by operating in a receiving mode for a parent selection period, and sets one of upper nodes that transmit data for resetting the path to the parent node of the node.

4. The wireless network system of claim 3,
   wherein data for resetting the path includes one or more among a hop count, a child count, and an operation time, and
   wherein the node sets a node, which transmits the path reset data in which one or more among a hop count, a child count, and an operation time are the smallest, to a parent node of the node with respect to path reset data in which RSSI (received signal strength indication) is equal to or greater than a predetermined value among the path reset data.

* * * * *